United States Patent
Shibata et al.

(10) Patent No.: US 10,699,455 B2
(45) Date of Patent: Jun. 30, 2020

(54) IMAGE PROCESSING SYSTEM, IMAGE PROCESSING METHOD, AND IMAGE PROCESSING PROGRAM RECORDING MEDIUM

(71) Applicants: NEC CORPORATION, Tokyo (JP); TOKYO INSTITUTE OF TECHNOLOGY, Tokyo (JP)

(72) Inventors: Takashi Shibata, Tokyo (JP); Masayuki Tanaka, Tokyo (JP); Masatoshi Okutomi, Tokyo (JP)

(73) Assignees: NEC CORPORATION, Minato-ku, Tokyo (JP); TOKYO INSTITUTE OF TECHNOLOGY, Meguro-ku, Tokyo (JP)

( * ) Notice: Subject to any disclaimer, the term of this patent is extended or adjusted under 35 U.S.C. 154(b) by 242 days.

(21) Appl. No.: 15/772,239

(22) PCT Filed: Sep. 14, 2016

(86) PCT No.: PCT/JP2016/004197
§ 371 (c)(1),
(2) Date: Apr. 30, 2018

(87) PCT Pub. No.: WO2017/077680
PCT Pub. Date: May 11, 2017

(65) Prior Publication Data
US 2018/0322672 A1    Nov. 8, 2018

(30) Foreign Application Priority Data

Nov. 5, 2015   (JP) ................................. 2015-217328

(51) Int. Cl.
*G06T 11/60*   (2006.01)
*H04N 1/40*    (2006.01)
(Continued)

(52) U.S. Cl.
CPC .............. *G06T 11/60* (2013.01); *G06T 5/001* (2013.01); *G06T 5/007* (2013.01); *G06T 5/50* (2013.01);
(Continued)

(58) Field of Classification Search
CPC ......... G06T 11/60; G06T 5/001; G06T 5/002; G06T 5/007; G06T 5/50;
(Continued)

(56) References Cited

U.S. PATENT DOCUMENTS 9,288,392 B2 * 3/2016 Chuang .............. H04N 5/23229
2005/0063611 A1 3/2005 Toki et al.
(Continued)

FOREIGN PATENT DOCUMENTS

| JP | 8-44863 A | 2/1996 |
|---|---|---|
| JP | 2003-60916 A | 2/2003 |

(Continued)

OTHER PUBLICATIONS

Patrick Perez et al., "Poisson Image Editing" ACM Transactions on Graphics (TOG), Jul. 27, 2003, pp. 313-318, vol. 22. No. 3.
(Continued)

*Primary Examiner* — Ali Bayat
(74) *Attorney, Agent, or Firm* — Sughrue Mion, PLLC

(57) ABSTRACT

An image processing system in which, in order to easily analyze input images acquired by sensors, output image quality is improved so that is suitable for a user. It includes: a gradient calculation unit that calculates a desired gradient based on input images; an indication function calculation unit that calculates an indication function for the input images, the indication function defining a range that can be taken by an output image and pixel values of a reference image; a pixel value renewal unit that renews pixel values of one of the input images so as to approximate the desired
(Continued)

gradient to produce a renewed image; and a pixel value constraint unit that updates pixel values of the renewed image so as to fall within the range that can be taken by the output image and to approximate the pixel values of the reference image, to thereby obtain the output image.

12 Claims, 6 Drawing Sheets

(51) Int. Cl.
    *H04N 1/409*    (2006.01)
    *H04N 1/58*     (2006.01)
    *G06T 5/00*     (2006.01)
    *G06T 5/50*     (2006.01)
    *G11B 27/031*   (2006.01)
    *G11B 27/28*    (2006.01)

(52) U.S. Cl.
    CPC ............ *G11B 27/031* (2013.01); *G11B 27/28* (2013.01); *H04N 1/40* (2013.01); *H04N 1/409* (2013.01); *H04N 1/58* (2013.01); *G06T 2207/10024* (2013.01)

(58) Field of Classification Search
    CPC ........ G06T 2207/10024; G11B 27/031; G11B 27/28; H04N 1/409; H04N 1/58; B60R 21/0134
    USPC .......................................... 382/282
    See application file for complete search history.

(56) References Cited

U.S. PATENT DOCUMENTS

| | | | |
|---|---|---|---|
| 2007/0024742 A1* | 2/2007 | Raskar | H04N 5/2352 348/370 |
| 2012/0170808 A1* | 7/2012 | Ogata | G06K 9/00798 382/103 |
| 2013/0114862 A1* | 5/2013 | Hohjoh | G06K 9/68 382/107 |
| 2014/0133779 A1 | 5/2014 | Funabashi et al. | |
| 2015/0029388 A1* | 1/2015 | Ng | G02B 3/0056 348/349 |
| 2018/0293710 A1* | 10/2018 | Meyer | G06T 5/002 |
| 2019/0304063 A1* | 10/2019 | Cansizoglu | G06T 3/4046 |

FOREIGN PATENT DOCUMENTS

| | | |
|---|---|---|
| JP | 2005-095328 A | 4/2005 |
| JP | 2013-218660 A | 10/2013 |

OTHER PUBLICATIONS

International Search Report for PCT/JP2016/004197 dated Oct. 25, 2016 [PCT/ISA/210].

Written Opinion for PCT/JP2016/004197 dated Oct. 25, 2016 [PCT/ISA/237].

* cited by examiner

IMAGE PROCESSING SYSTEM, IMAGE PROCESSING METHOD, AND IMAGE PROCESSING PROGRAM RECORDING MEDIUM

CROSS REFERENCE TO RELATED APPLICATIONS

This application is a National Stage of International Application No. PCT/JP2016/004197 filed Sep. 14, 2016, claiming priority based on Japanese Patent Application No. 2015-217328 filed Nov. 5, 2015, the disclosure of which is incorporated herein in its entirety by reference.

TECHNICAL FIELD

This invention relates to an image processing technology, and more particularly, to an image processing system, an image processing method, and an image processing program recording medium.

BACKGROUND ART

Recently, a variety of image composition methods have been developed. Moreover, a variety of cameras that operate under a variety of settings (e.g., exposure amount and exposure time) are available, and those cameras acquire images with a variety of sensitivity characteristics for a wavelength band. Moreover, even cameras with the same settings acquire substantially different images depending on whether or not to light the flash during photography.

Moreover, cameras using sensors suited for photographing a variety of target objects are widespread. For example, a monitoring camera using a visible light sensor is widespread in order to monitor a person and other such objects. Meanwhile, a camera using a non-visible light sensor, for example, a near-infrared camera or a far-infrared camera, is also widespread for night-time monitoring. Moreover, among other cameras, a near-ultraviolet camera is also commercially available. Alternatively, among other cameras, a device configured to image a wavelength that is longer than a wavelength region of visible light, for example, a terahertz wave and a radio wave, is also commercially available.

In view of the above-mentioned background, in order to easily analyze input images acquired by a variety of sensors, it is required to improve an output image to an image that is suitable for a user. In Non Patent Document 1, there is disclosed, as image processing that is useful for such application, a method of performing processing based on gradient information (difference value between adjacent pixels) of an image.

In the method disclosed in Non Patent Document 1, as described in detail below with reference to FIG. 1, a target gradient is calculated based on a reference image group, and pixel values of an input image are renewed in such a manner that the target gradient and a gradient of an output image match each other to obtain the output image.

PRIOR ART DOCUMENTS

Non Patent Document

Non Patent Document 1: Patrick Perez, Michel Gangnet, and Andrew Blake. "Poisson Image Editing." ACM Transactions on Graphics (TOG). Vol. 22. No. 3. ACM, 2003.

SUMMARY OF THE INVENTION

Problem to be Solved by the Invention

However, the method of Non Patent Document 1 does not have a constraint on absolute values (pixel values) per se of the output image. Therefore, the method of Non Patent Document 1 has a problem in that artifacts, such as lost detailed structures, white out, black out, a halo effect, and ringing occur.

It is an object of this invention to provide an image processing system, an image processing method, and an image processing program recording medium, which solve the above-mentioned problem.

Means to Solve the Problem

An image processing system of the present invention comprising: a gradient calculation unit configured to calculate a desired gradient based on input images; an indication function calculation unit configured to calculate an indication function for the input images, the indication function defining a range that can be taken by an output image and pixel values of a reference image: a pixel value renewal unit configured to renew pixel values of one of the input images so as to approximate the desired gradient to produce a renewed image; and a pixel value constraint unit configured to update pixel values of the renewed image so as to fall within the range that can be taken by the output image and to approximate the pixel values of the reference image, to thereby obtain the output image.

An image processing method of the present invention is an image processing method for use in an image processing system configured to analyze input images acquired by a variety of sensors to obtain an output image, the image processing method comprising: a gradient calculation step of calculating, by a gradient calculation unit, a desired gradient based on the input images: an indication function calculation step of calculating, by an indication function calculation unit, an indication function for the input images, the indication function defining a range that can be taken by the output image and pixel values of a reference image; a pixel value renewal step of renewing, by a pixel value renewal unit, pixel values of one of the input images so as to approximate the desired gradient to produce a renewed image; and a pixel value constraint step of updating, by a pixel value constraint unit, pixel values of the renewed image so as to fall within the range that can be taken by the output image and to approximate the pixel values of the reference image, to thereby obtain the output image.

An image processing program recording medium of the present invention is a recording medium having recorded thereon an image processing program for an image processing system, which is configured to cause a computer to analyze input images acquired by a variety of sensors to obtain an output image, the image processing program causing the computer to execute: a gradient calculation procedure of calculating a desired gradient based on the input images: an indication function calculation procedure of calculating an indication function for the input images, the indication function defining a range that can be taken by the output image and pixel values of a reference image; a pixel value renewal procedure of renewing pixel values of one of the input images so as to approximate the desired gradient to produce a renewed image; and a pixel value constraint procedure of updating pixel values of the renewed image so as to fall within the range that can be taken by the output image and to approximate the pixel values of the reference image, to thereby obtain the output image.

Effect of the Invention

According to this invention, in order to easily analyze the input images acquired by the variety of sensors, the output image can be improved to have image quality that is suitable for a user.

MODE FOR EMBODYING THE INVENTION

Related Art

First, in order to facilitate understanding of this invention, description will proceed to an image processing system according to the related art, which is disclosed in Non Patent Document 1 described above.

Figure 1:
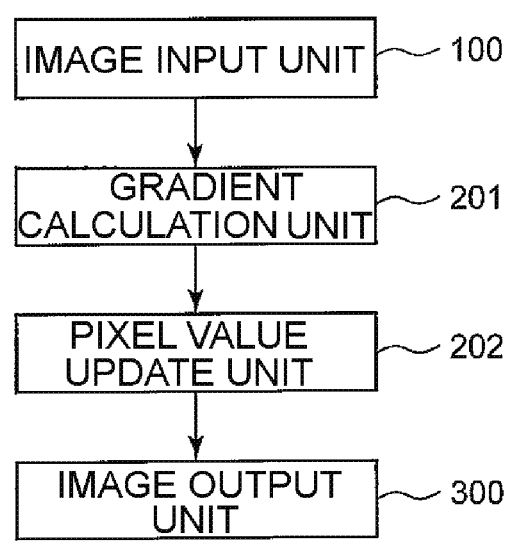
FIG. 1 is a block diagram for illustrating a schematic configuration of an image processing system according to the related art disclosed in Non Patent Document 1.

FIG. 1 is a block diagram for illustrating the image processing system according to the related art described in Non Patent Document 1. The image processing system described in Non Patent Document 1 comprises an image input unit 100, a gradient calculation unit 201, a pixel value renewal unit 202, and an image output unit 300.

The image input unit 100 is supplied with a group of one or more images. Then, the image input unit 100 records the input images in a memory (not shown), for example.

The gradient calculation unit 201 is configured to calculate a target gradient based on a reference image group.

The pixel value renewal unit 202 is configured to renew pixel values of the input image in such a manner that the target gradient and a gradient of an output image match each other to obtain the output image.

Specifically, the pixel value renewal unit 202 is configured to renew the pixel values as expressed by Math. 2 below so as to minimize Math. 1 below, for example.

[Math. 1]
$$E(\{X_i\}) = \sum_i \{\|\nabla X_i - \vec{\nabla X}_i\|_2^2\} \quad (1)$$

[Math. 2]
$$X_i \leftarrow X_i + t\nabla \cdot (\nabla X_i - \vec{\nabla X}_i) \quad (2)$$

Where,

[Math. 3]
$$X_i$$

represents the i-th pixel value of the output image, $$\nabla X_i \quad \text{[Math. 4]}$$

represents a gradient of the i-th pixel of the output image, $$\vec{\nabla X}_i \text{[Math. 5]}$$

represents a gradient of a pixel i of a target image, and $$t=\text{[Math. 6]}$$

represents a parameter regarding a renewal that is predefined by a user.

The image output unit 300 is configured to produce the output image to a display or other such device.

However, the image processing system of Non Patent Document 1, which is illustrated in FIG. 1, does not have a constraint on absolute values (pixel values) per se of the output image. Therefore, the image processing system of Non Patent Document 1, which is illustrated in FIG. 1, has a disadvantage in that artifacts, such as lost detailed structures, white out, black out, a halo effect, and ringing occur.

Figure 2:
FIG. 2 is a diagram for illustrating a problem to be solved by this invention.

Next, referring to FIG. 2, description further will proceed to a problem to be solved by this invention in detail.

An input image illustrated in FIG. 2 has a wide dynamic range (difference between a dark portion and a light portion). Therefore, when the input image of FIG. 2 is processed using the related-art method disclosed in Non Patent Document 1, white out and black out occur in the output image obtained as a result of the processing.

EXAMPLE EMBODIMENTS

Next, description will proceed to example embodiments of this invention in detail with reference to the drawings.

Description of Configuration in First Example Embodiment

Figure 3:
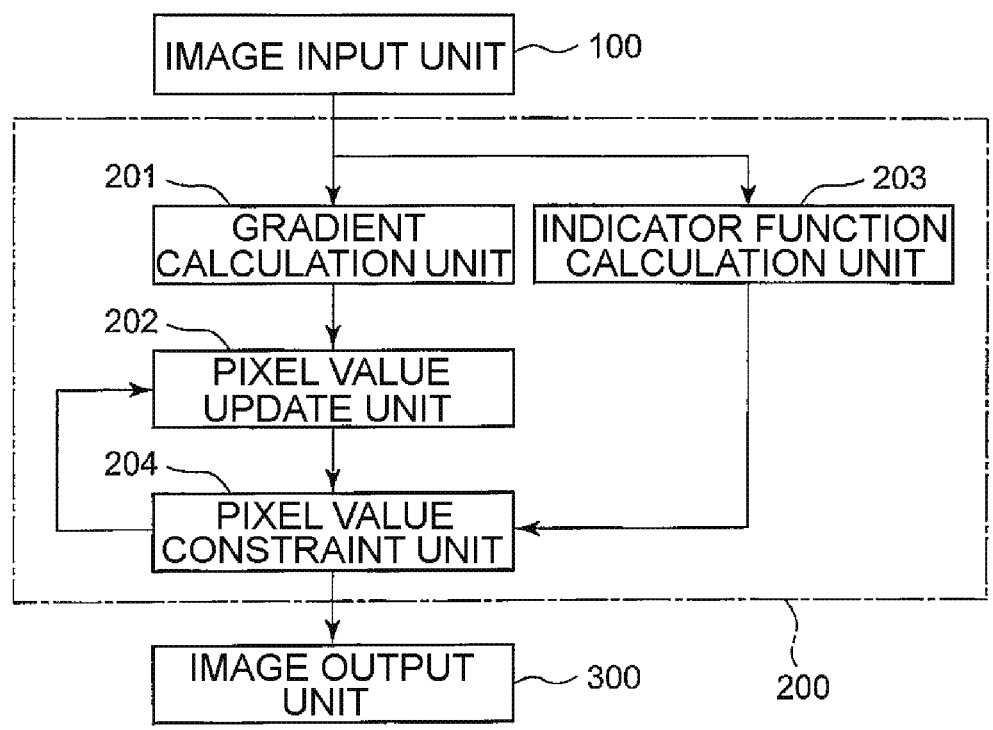
FIG. 3 is a block diagram for illustrating a schematic configuration of an image processing system according to a first example embodiment of this invention.

FIG. 3 is a block diagram for illustrating a schematic configuration of an image processing system according to a first example embodiment of this invention.

Referring to FIG. 3, the image processing system according to the first example embodiment of this invention comprises an image input unit 100, a computer (central processing unit; processor; data processing device) 200, which operates under program control, and an image output unit 300.

The image processing system illustrated in FIG. 3 is a system configured to analyze input images acquired by a variety of sensors to obtain the output image.

The computer (central processing unit; processor: data processing device) 200 includes a gradient calculation unit 201, a pixel value renewal unit 202, an indication function calculation unit 203, and a pixel value constraint unit 204.

In other words, the image processing system illustrated in FIG. 3 has a configuration obtained by further adding, to the related-art image processing system illustrated in FIG. 1, the indicator function calculation unit 203 and the pixel value constraint unit 204.

The above-mentioned means each operate generally as follows.

The image input unit 100 is supplied with images obtained by a camera and other such devices. As the images to be input, a color image and images acquired by other sensors may be input separately. Then, the image input unit 100 records the input images in a memory (not shown), for example.

In the following description, when an RGB image is given as an input color image, red, green, and blue pixel values of the i-th pixel are expressed as Ri, Gi, and Bi, respectively.

Moreover, those components are collectively expressed as:

$$Ii=(Ri,Gi,Bi) \quad \text{[Math. 7]}$$

Further, when there is an image that is acquired from another sensor other than the input color image, a pixel value of the i-th pixel is expressed using a subscript also for the image. For example, when a case in which a near-infrared image is input in addition to the input color image is described as an example, the i-th pixel value of the near-infrared image may be expressed as Ni.

Moreover, similarly to the input images, an output image is also expressed by a matrix obtained by arranging pixel values of each pixel in raster scan order. More specifically, when an RGB image is given as an output color image, red, green, and blue pixel values of the i-th pixel are expressed as Ri, Gi, and Bi, respectively.

The image output unit 300 is an output device configured to produce a reconstructed image (output image). The image output unit 300 is implemented by a display device, for example.

The gradient calculation unit 201 is configured to determine a desired gradient based on the input images, which are received as inputs by the image input unit 100. As a method of determining the gradient, a gradient of an input image may be simply multiplied by a constant, the gradient may be normalized by some method, or the gradient may be expressed as a weighted sum based on two or more images, for example. In a case of image enhancement, for example, the gradient calculation unit 201 may multiply a gradient of an input image by a constant, and the obtained result may be set as the desired gradient.

The pixel value renewal unit 202 is configured to renew pixel values of an input image in such a manner that the target gradient and a gradient of the output image approximate each other to produce a renewed image. Specifically, as described above, the pixel value renewal unit 202 is configured to renew the pixel values of the input image as expressed by the above-mentioned Math. 2 so as to minimize the above-mentioned Math. 1, for example. In other words, the pixel value renewal unit 202 in the example embodiment of this invention may be similar to that of the related art described above.

In the first example embodiment, there has been described the method of renewing, by the pixel value renewal unit 202, values of the pixel values of the output image in such a manner that the target gradient and the gradient of the output image approximate each other, but the first example embodiment is not limited thereto. For example, a term corresponding to a reconstruction constraint (also called as "data term" or "fidelity term"), which is used in super-resolution, noise reduction, or inpainting, may be adopted, and a method of renewing the pixel values in accordance with the term may be performed by the pixel value renewal unit 202.

In order to suppress white out, black out, ringing, the halo effect, or other such artifacts, the indication function calculation unit 203 is configured to calculate an indication function for defining a domain that constrains a range that can be taken by the pixel values of the output image. As a method of calculating the indication function, as expressed by Math. 8 below, an indication function that is uniform over an entire image may be used for the input image, for example.

$$\phi_i(X_i) = \begin{cases} 0 & 0 \le X_i \le 255 \\ \infty & \text{otherwise} \end{cases} \quad \text{[Math. 8]}$$

Alternatively, as the method of calculating the indication function, as expressed by Math. 9 below, there may be used an indication function that is adaptable for each pixel, which is determined based on a minimum value and a maximum value of a pixel of interest for the input images.

$$\phi_i(X_i) = \begin{cases} 0 & \min_{j \in N_i} Y_j \le X_i \le \max_{j \in N_i} Y_j \\ \infty & \text{otherwise} \end{cases} \quad \text{[Math. 9]}$$

Moreover, it is not required for the indication function calculation unit 203 to use the same function over the entire image for the input image. For example, the indication function calculation unit 203 may use, as the indication function, an indication function that is uniform over the entire image for one portion of the input image, and an indication function that is adaptable for each pixel for a remaining portion of the input image. In any case, the indication function calculated by the indication function calculation unit 203 may be any function as long as the function defines the range that can be taken by the pixel values of the output image in some way.

In the first example embodiment, there has been described the case of using the same indication function over the entire image, or the indication function that is adaptable for each pixel, but the first example embodiment is not limited thereto. For example, instead of the indication function, the range that can be taken by the pixel values may be defined using a function as expressed by Math. 10 below.

$$\phi_i(X_i) = \begin{cases} \lambda|X_i - Z_i| & \min_{j \in N_i} Y_j \le X_i \le \max_{j \in N_i} Y_j \\ \infty & \text{otherwise} \end{cases} \quad \text{[Math. 10]}$$

Where, λ represents a parameter predefined by the user. Moreover. Zi represents an image serving as a guide, and Zi may be calculated using an edge-preserving spatial filter, for example. Such indication function may be used to compose the reconstructed image in such a manner that the pixel values fall within the domain while suppressing noise in the image.

The pixel value constraint unit 204 is configured to update pixel values of the renewed image in such a manner that the pixel values of the output image fall within the domain in accordance with the defined indication function, to thereby obtain the output image. As an update method, as expressed by Math. 11 below, the indication function that is uniform over the entire image may be used to update the renewed image, for example.

$$prox(X_i) = \begin{cases} X_i & 0 \le X_i \le 255 \\ 255 & X_i > 255 \\ 0 & X_i < 0 \end{cases} \quad \text{[Math. 11]}$$

Alternatively, as the update method, as expressed by Math. 12 below, an update amount of each of the pixel values of the renewed image may be determined in accordance with the indication function that is adaptable for each pixel, which is determined based on the minimum value and the maximum value of the pixel of interest.

$$prox(X_i) = \begin{cases} X_i & \min_{j \in N_i} Y_j \leq X_i \leq \max_{j \in N_i} Y_j \\ \max_{j \in N_i} Y_j & X_i > \max_{j \in N_i} Y_j \\ \min_{j \in N_i} Y_j & X_i < \min_{j \in N_i} Y_j \end{cases} \quad [\text{Math. 12}]$$

Moreover, it is not required for the pixel value constraint unit 204 to use the same indication function over the entire image. For example, the pixel value constraint unit 204 may update each of the pixel values of the renewed image in accordance with the indication function that is uniform over the entire image for the one portion of the input image, and each of the pixel values of the renewed image in accordance with the indication function that is adaptable for each pixel for the remaining portion of the input image. In any case, the indication function used in the pixel value constraint unit 204 may be any function as long as the function defines the range that can be taken by the pixel values of the output image in some way.

Description of Operation in First Example Embodiment

Figure 4:
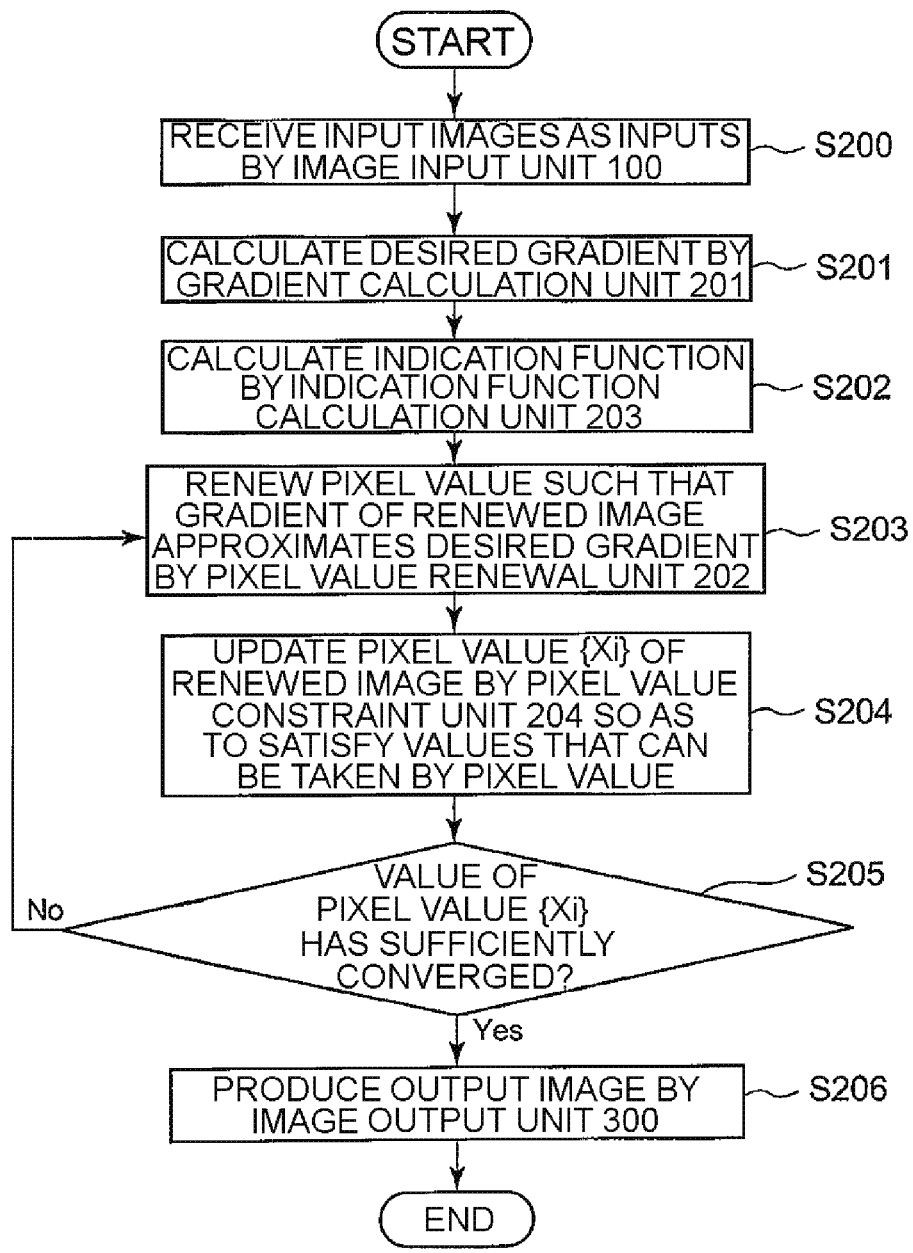
FIG. 4 is a flow chart for illustrating operation of the image processing system illustrated in FIG. 3.

Next, referring to a flow chart of FIG. 4, description will proceed to overall operation of the image processing system according to the first example embodiment in detail.

First, the image input unit 100 receives, as inputs, the input image acquired from one or more sensors (Step S200).

Next, the gradient calculation unit 201 calculates the desired gradient based on the input images (Step S201).

Next, the indication function calculation unit 203 calculates the indication function that defines the range that can be taken by the pixel values of the output image and reference pixel values for the input images (Step S202).

Further, the pixel value renewal unit 202 renews the pixel values of the input image in such a manner that a gradient of the renewed image approximates the desired gradient to produce the renewed image (Step S203).

The pixel value constraint unit 204 updates the pixel values of the renewed image so as to satisfy the values that can be taken by the pixel values, which are calculated by the indication function calculation unit 203, to thereby obtain the output image (Step S204).

Next, the computer 200 determines whether or not the value of the pixel value $$\{Xi\} \quad [\text{Math. 13}]$$

of the output image has sufficiently converged (Step S205). When the value of the pixel value $$\{Xi\} \quad [\text{Math. 14}]$$

of the output image has not sufficiently converged (No in Step S205), the computer 200 repeats the processing of Steps S203 to S204 again (Step S205).

When the value of the pixel value $$\{Xi\} \quad [\text{Math. 15}]$$

of the output image has been sufficiently converged (Yes in Step S205), the image output unit 300 produces the output image comprising the pixel value (Step S206).

Description of Effects in First Example Embodiment

Next, description will proceed to effects of the first example embodiment.

According to the first example embodiment of this invention, in order to easily analyze the input images acquired by the variety of sensors, the output image can be improved to have image quality that is suitable for the user. This is because the indication function calculation unit 203 calculates the range that can be taken by the output image and pixel values of a reference image, and because the pixel value constraint unit 204 updates the pixel values of the renewed image so as to fall within the range that can be taken by the output image and to approximate the pixel values of the reference image.

Figure 5:
FIG. 5 is a diagram for illustrating effects by the image processing system illustrated in FIG. 3.

For example, as a specific example of the effects of the first example embodiment of this invention, in contrast to the input image illustrated in FIG. 2, the entire image can be displayed in one image as in the output image illustrated in FIG. 5.

The respective units of the image processing system may be implemented using a combination of hardware and software. In an embodiment combining hardware and software, an image processing program is loaded on a random access memory (RAM), and a control unit (central processing unit (CPU)) or other such hardware is operated based on the program to implement the respective units as a variety of means. Moreover, the program may be distributed by being recorded on a recording medium. The program recorded on the recording medium is read into a memory wiredly, wirelessly, or via the recording medium itself to operate the control unit and other such units. Examples of the recording medium include an optical disc, a magnetic disk, a semiconductor memory device, and a hard disk.

When the above-mentioned first example embodiment is described in different terms, a computer that is caused to operate as the image processing system can be implemented by causing the computer to operate as the gradient calculation unit 201, the pixel value renewal unit 202, the indication function calculation unit 203, and the pixel value constraint unit 204 based on the image processing program loaded on the RAM.

As described above, according to the first example embodiment of this invention, the output image can be improved to have the image quality that is suitable for the user.

Description of Configuration in Second Example Embodiment

Figure 6:
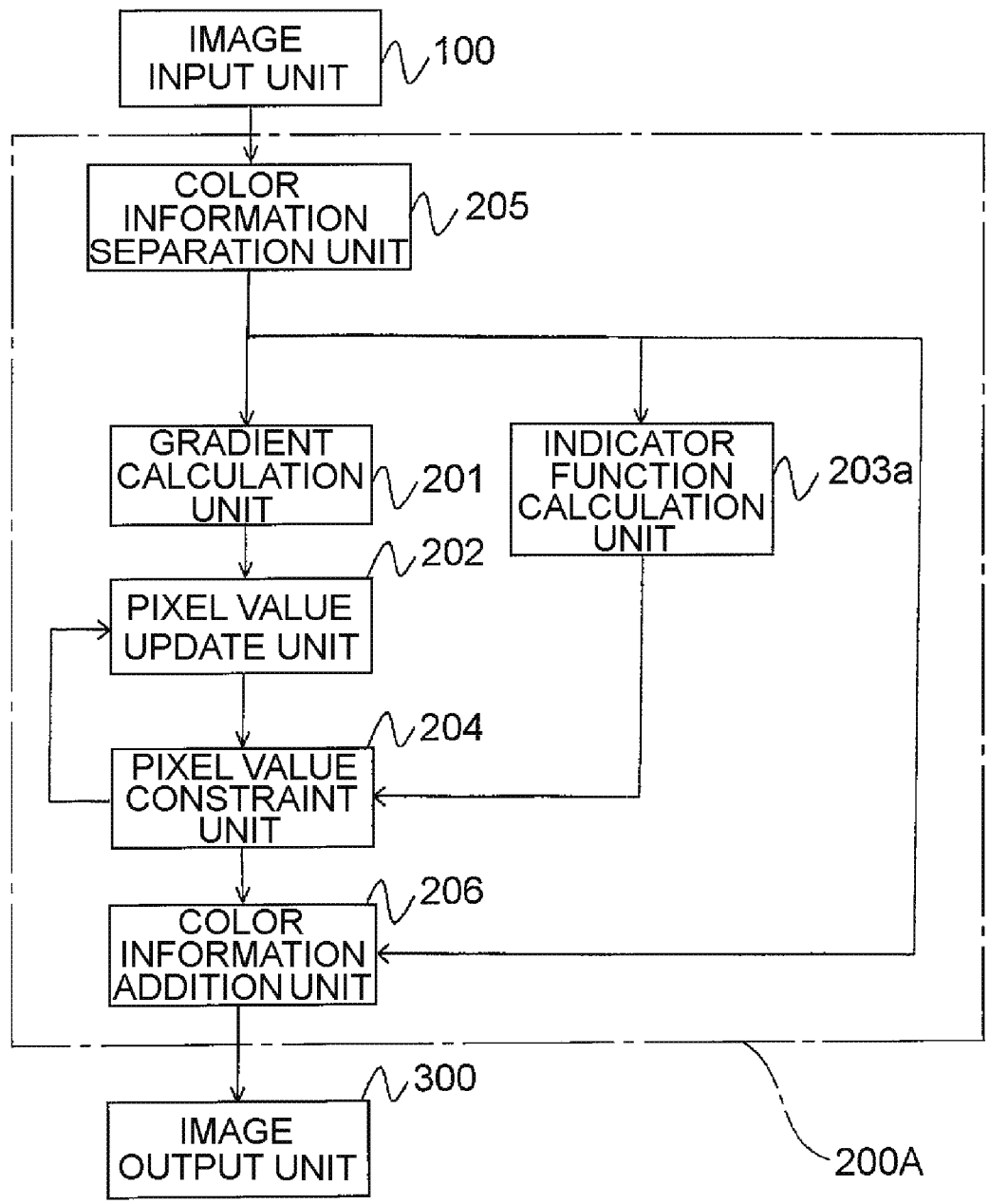
FIG. 6 is a block diagram for illustrating a schematic configuration of an image processing system according to a second example embodiment of this invention.

FIG. 6 is a block diagram for illustrating a schematic configuration of an image processing system according to a second example embodiment of this invention.

Referring to FIG. 6, the image processing system according to the second example embodiment of this invention comprises an image input unit 100, a computer (central processing unit: processor; data processing device) 200A, which operates under program control, and an image output unit 300.

The image processing system illustrated in FIG. 6 is a system configured to analyze input images acquired by a variety of sensors, to thereby obtain the output image.

The computer (central processing unit: processor; data processing device) 200A comprises a gradient calculation unit 201, a pixel value renewal unit 202, an indication function calculation unit 203a, a pixel value constraint unit 204, a color information separation unit 205, and a color information addition unit 206.

In other words, the image processing system illustrated in FIG. 6 has a configuration obtained by further adding, to the image processing system according to the first example embodiment, which is illustrated in FIG. 3, the color information separation unit 205 and the color information addition unit 206, and has operation of the indication function calculation unit changed as described later.

Now, description will proceed to operations of respective components. The operations of the gradient calculation unit 201, the pixel value renewal unit 202, the pixel value constraint unit 204, and the image output unit 300 are similar to those in the first example embodiment, and hence a description thereof is omitted.

Moreover, in the following, in order to simplify the description, there is described a case in which color images are received as inputs by the image input unit 100, and in which the gradient calculation unit 201, the pixel value renewal unit 202, and the pixel value constraint unit 204 process only a brightness component or a luminance component of the image, but the second example embodiment is not limited thereto. For example, multispectral images may be received as inputs by the image input unit 100, or the gradient calculation unit 201, the pixel value renewal unit 202, and the pixel value constraint unit 204 may process, instead of the brightness component or the luminance component of the image, another component (for example, saturation component or hue component, or a band forming a part of the multispectral image).

The color information separation unit 205 is configured to separate a color component and a brightness from each of the color images received as the inputs by the image input unit 100. More specifically, when pixel values defined in an RGB color space are received as the inputs of the color images by the image input unit 100, for example, the color information separation unit 205 converts the pixel values of respective pixels defined in the RGB color space into pixel values in a YUV color space or an Lab color space. Then, the color information separation unit 205 extracts the brightness component of the pixel values defined in the YUV color space or the Lab color space, that is, a Y component or an L component. Then, the color information separation unit 205 may separate the brightness component and the color component by extracting UV components or ab components as the color component. Then, the color information separation unit 205 passes the brightness component to the gradient calculation unit 201, and the color component to the indication function calculation unit 203a and the color information addition unit 206.

The indication function calculation unit 203a is configured to calculate, based on the color component calculated by the color information separation unit 205, a range that can be taken by the brightness under a constraint of preserving colors of the input image as the indication function for each pixel. For example, when the color component is expressed as the ab components in the Lab space, the indication function calculation unit 203a calculates a range that can be taken by L under a constraint of preserving the colors of the input image.

More specifically, when ab components of a pixel are $a_0$ and $b_0$, for example, the indication function calculation unit 203a first discretely samples N values of L, which is a brightness, over an entire range (that is, from 0 to 100) that can be taken, to thereby obtain a plurality of pixel values. Those sampled pixel values in the Lab space are hereinafter expressed as $\{(L_1,a_0,b_0) \ldots (L_N,a_0,b_0)\}$. Next, the indication function calculation unit 203a converts those pixel values that are expressed in the Lab space into pixel values in the RGB space. Those pixel values are hereinafter expressed as $\{(r_1,g_1,b_1) \ldots (r_N,g_N,b_N)\}$. Next, when any one of those pixel values on the RGB space, which are obtained by the conversion, does not fall within a predefined range (that is, range of from 0 to 255 in an 8-bit image), that is, when a pixel value is saturated (that is, 0 or less or 255 or more in an 8-bit image) in any one of the components, the indication function calculation unit 203a discards the sample. Lastly, of all samples that are not discarded, the indication function calculation unit 203a expresses the minimum value and the maximum value of the brightness component as $R_{min}$ and $R_{max}$, respectively, sets a range therebetween as the range that can be taken by the brightness under the constraint of preserving the colors of the input image, and defines an indication function based on the range. At this time, renewal of the pixel values in accordance with the indication function is expressed in the pixel value renewal unit 202 as Math. 16 below.

$$prox(X_i) = \begin{cases} X_i & R_{min} \leq X_i \leq R_{max} \\ R_{max} & X_i > R_{max} \\ R_{min} & X_i < R_{min} \end{cases} \quad [\text{Math. 16}]$$

In the above description, there has been described the case in which the indication function calculation unit 203a calculates, based on the sampled values, the range that can be taken by the brightness under the constraint of preserving the colors of the input image, but the operation of the indication function calculation unit 203a is not limited thereto.

The color information addition unit 206 is configured to compose a color image based on the brightness obtained by the pixel value constraint unit 204 and the color component obtained by the color information separation unit 205.

Description of Effects of Second Example Embodiment

Next, description will proceed to effects of the second example embodiment.

In the second example embodiment, based on the color component separated by the color information separation unit 205, the indication function calculation unit 203a calculates, as the indication function, the range that can be taken by the brightness under the constraint of preserving the colors of the input image. Then, based on the indication function, the pixel value constraint unit 204 calculates the brightness component. Then, based on the calculated brightness component and the color component of the input image, the color information addition unit 206 composes an output image. With the above-mentioned configuration, in the second example embodiment, in order to easily analyze the input images acquired by the variety of sensors while preserving the color component of the input image, the output image can be improved to have the image quality that is suitable for the user.

Further, the specific configuration of this invention is not limited to the example embodiments described above, and changes that do not depart from the gist of the invention are encompassed by the invention.

While the invention has been particularly shown and described with reference to example embodiments thereof, the invention is not limited to these embodiments. It will be understood by those of ordinary skill in the art that various changes in form and details may be made therein without departing from the spirit of the present invention as defined by the claims.

REFERENCE SIGNS LIST 100 image input unit
200, 200A computer (central processing unit; processor; data processing device)
201 gradient calculation unit
202 pixel value renewal unit
203, 203a indication function calculation unit
204 pixel value constraint unit
205 color information separation unit
206 color information addition unit
300 image output unit

The invention claimed is:

1. An image processing system, comprising:
a gradient calculation circuitry configured to calculate a desired gradient based on input images;
an indication function calculation circuitry configured to calculate an indication function for the input images, the indication function defining a range that can be taken by an output image and pixel values of a reference image;
a pixel value renewal circuitry configured to renew pixel values of one of the input images so as to approximate the desired gradient to produce a renewed image; and
a pixel value constraint circuitry configured to update pixel values of the renewed image so as to fall within the range that can be taken by the output image and to approximate the pixel values of the reference image, to thereby obtain the output image.

2. The image processing system according to claim 1,
wherein the indication function calculation circuitry is configured to calculate, as the indication function, an indication function that is uniform over an entire image for the one of the input images, and
wherein the pixel value constraint circuitry is configured to update the pixel values of the renewed image using the indication function that is uniform over the entire image, to thereby obtain the output image.

3. The image processing system according to claim 1,
wherein the indication function calculation circuitry is configured to calculate, as the indication function, an indication function that is adaptable for each pixel, which is determined based on a minimum value and a maximum value of a pixel of interest for the input images, and
wherein the pixel value constraint circuitry is configured to determine an update amount of each of the pixel values of the renewed image in accordance with the indication function that is adaptable for each pixel, to thereby obtain the output image.

4. The image processing system according to claim 1,
wherein the indication function calculation circuitry is configured to calculate, as the indication function, an indication function that is uniform over an entire image for one portion of the one of the input images, and an indication function that is adaptable for each pixel for a remaining portion of the one of the input images, and
wherein the pixel value constraint circuitry is configured to update each of the pixel values of the renewed image in accordance with the indication function that is uniform over the entire image for the one portion of the one of the input images, and each of the pixel values of the renewed image in accordance with the indication function that is adaptable for each pixel for the remaining portion of the one of the input images, to thereby obtain the output image.

5. An image processing method for use in an image processing system, which is configured to analyze input images acquired by a variety of sensors to obtain an output image, the image processing method comprising:
calculating a desired gradient based on the input images;
calculating an indication function for the input images, the indication function defining a range that can be taken by the output image and pixel values of a reference image;
renewing pixel values of one of the input images so as to approximate the desired gradient to produce a renewed image; and
updating pixel values of the renewed image so as to fall within the range that can be taken by the output image and to approximate the pixel values of the reference image, to thereby obtain the output image.

6. The image processing method according to claim 5,
wherein the calculating the indication function includes calculating as the indication function, an indication function that is uniform over an entire image for the one of the input images, and
wherein the updating the pixel values of the renewed image includes updating the pixel values of the renewed image using the indication function that is uniform over the entire image, to thereby obtain the output image.

7. The image processing method according to claim 5,
wherein the calculating the indication function includes calculating as the indication function, an indication function that is adaptable for each pixel, which is determined based on a minimum value and a maximum value of a pixel of interest for the input images, and
wherein the updating the pixel values of the renewed image includes determining an update amount of each of the pixel values of the renewed image in accordance with the indication function that is adaptable for each pixel, to thereby obtain the output image.

8. The image processing method according to claim 5,
wherein the calculating the indication function includes calculating as the indication function, an indication function that is uniform over an entire image for one portion of the one of the input images, and an indication function that is adaptable for each pixel for a remaining portion of the one of the input images, and
wherein the updating the pixel values of the renewed image includes updating each of the pixel values of the renewed image in accordance with the indication function that is uniform over the entire image for the one portion of the one of the input images, and each of the pixel values of the renewed image in accordance with the indication function that is adaptable for each pixel for the remaining portion of the one of the input images, to thereby obtain the output image.

9. A non-transitory computer recording medium having recorded thereon an image processing program for an image processing system, which is configured to cause a computer to analyze input images acquired by a variety of sensors to obtain an output image, the image processing program causing the computer to execute:
a gradient calculation procedure of calculating a desired gradient based on the input images;
an indication function calculation procedure of calculating an indication function for the input images, the indication function defining a range that can be taken by the output image and pixel values of a reference image;

a pixel value renewal procedure of renewing pixel values of one of the input images so as to approximate the desired gradient to produce a renewed image; and a pixel value constraint procedure of updating pixel values of the renewed image so as to fall within the range that can be taken by the output image and to approximate the pixel values of the reference image, to thereby obtain the output image.

10. The non-transitory computer recording medium according to claim 9, wherein the indication function calculation procedure includes causing the computer to calculate, as the indication function, an indication function that is uniform over an entire image for the one of the input images, and wherein the pixel value constraint procedure includes causing the computer to update the pixel values of the renewed image using the indication function that is uniform over the entire image, to thereby obtain the output image.

11. The non-transitory computer recording medium according to claim 9, wherein the indication function calculation procedure includes causing the computer to calculate, as the indication function, an indication function that is adaptable for each pixel, which is determined based on a minimum value and a maximum value of a pixel of interest for the input images, and wherein the pixel value constraint procedure includes causing the computer to determine an update amount of each of the pixel values of the renewed image in accordance with the indication function that is adaptable for each pixel, to thereby obtain the output image.

12. The non-transitory computer recording medium according to claim 9, wherein the indication function calculation procedure includes causing the computer to calculate, as the indication function, an indication function that is uniform over an entire image for one portion of the one of the input images, and an indication function that is adaptable for each pixel for a remaining portion of the one of the input images, and wherein the pixel value constraint procedure includes causing the computer to update each of the pixel values of the renewed image in accordance with the indication function that is uniform over the entire image for the one portion of the one of the input images, and each of the pixel values of the renewed image in accordance with the indication function that is adaptable for each pixel for the remaining portion of the one of the input images, to thereby obtain the output image.

* * * * *